Patented Aug. 18, 1925.

1,550,026

UNITED STATES PATENT OFFICE.

ESLANDA CARDOZO GOODE, OF NEW YORK, N. Y.

FACE PACK.

No Drawing.     Application filed July 5, 1923. Serial No. 649,734.

*To all whom it may concern:*

Be it known that ESLANDA CARDOZO GOODE, citizen of the United States, residing at New York city, New York, has invented a new and useful Improvement in a Face Pack, of which the following is a specification.

The object of my invention is to provide a face pack or mask which may be applied to the skin without any danger of producing an injurious effect and which will so act upon the skin as to cause the pores thereof to contract.

It has been observed and is well-known that with the advance in age, the skin of adults creases and wrinkles. This creasing and wrinkling is due to the fact that the pores of the skin increase in size with relaxation and this increase causes a folding over or creasing of the skin. Great demand exists for a product which will prevent or relieve the appearance of the creases or wrinkles in the skin and my invention accomplishes such results.

In order to accomplish the desired result, I find that an astringent, such as potash alum when applied to the skin causes the pores to contract and thus overcome the natural increase in the size thereof. In order, however, to apply such astringent without unpleasant effect, I use a soothing or healing agent, such as casein and such ingredient is found to give its best results when held in a plastic or pasty state as by the use of oat-flour. The oat-flour acts as a carrying or mask forming agent and as well has the characteristics of bleaching and soothing.

In preparing the composition, I prefer to use the ingredients in about the following proportions:—viz, twenty ounces of oatmeal, three ounces of potash alum and one ounce of casein.

Good results may be obtained, however, when the ingredients are varied within the following limits:—viz, astringent such as potash alum, two and one-half to three and one-half ounces; soothing or healing agent such as casein, one-half to one and one-half ounces; binder or carrying agent, such as oat-flour, eighteen to twenty-two ounces.

These ingredients are mixed with cold water sufficient to form a paste to have the consistency of cream cheese, so as to enable it to be held together sufficiently to be smeared over the skin.

The composition is then left to dry upon the skin and this drying is found to take about twenty minutes more or less. When dry, the pack is gently mopped from the skin with a sponge and cold water. This operation may be repeated daily or as often as may be found to be desirable.

My composition is easily and inexpensively prepared; is applied to the skin with facility and as a whole possesses in a high degree, all the desired properties of a product for leaving the skin with a smooth, and wholesome appearance, all without injurious result.

I claim:

1. A composition adapted to form, when mixed with water, a plastic pack for application to the human skin, comprising two and one-half to three and one-half ounces of potash alum, one-half to one and one-half ounces of casein and eighteen to twenty-two ounces of oat-flour.

2. A composition consisting of three ounces potash alum, one ounce of casein and twenty ounces of oat-flour.

In testimony whereof, ESLANDA CARDOZO GOODE, has signed her name to this specification this 18th day of June, 1923.

ESLANDA CARDOZO GOODE.